(12) United States Patent
Wang et al.

(10) Patent No.: US 12,230,290 B2
(45) Date of Patent: Feb. 18, 2025

(54) METHOD, DEVICE, AND COMPUTER PROGRAM PRODUCT FOR GENERATING VIDEO

(71) Applicant: Dell Products L.P., Round Rock, TX (US)

(72) Inventors: Zijia Wang, Weifang (CN); Yufeng Wang, Shanghai (CN); Chunxi Chen, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 205 days.

(21) Appl. No.: 18/130,251

(22) Filed: Apr. 3, 2023

(65) Prior Publication Data

US 2024/0290345 A1    Aug. 29, 2024

(30) Foreign Application Priority Data

Feb. 28, 2023   (CN) .......................... 202310199233.8

(51) Int. Cl.
*G10L 25/57*   (2013.01)
*G06F 40/263*   (2020.01)
(Continued)

(52) U.S. Cl.
CPC ............ *G10L 25/57* (2013.01); *G06F 40/263* (2020.01); *G06V 20/47* (2022.01); *G06V 20/49* (2022.01); *G10L 25/30* (2013.01)

(58) Field of Classification Search
CPC ....... G10L 25/57; G10L 25/30; G06F 40/263; G06V 20/49; G06V 20/47
See application file for complete search history.

(56) References Cited

U.S. PATENT DOCUMENTS 10,055,406 B2 *  8/2018  Yu .......................... G06F 40/169
2016/0021333 A1 *  1/2016  Lim .......................... H04N 5/91
                                                    386/248

(Continued)

OTHER PUBLICATIONS

S. Reed et al., "Generative Adversarial Text to Image Synthesis," International Conference on Machine Learning, arXiv:1605.05396v2, Jun. 5, 2016, 10 pages.

(Continued)

*Primary Examiner* — Sunghyoun Park
(74) *Attorney, Agent, or Firm* — Ryan, Mason & Lewis, LLP (57) ABSTRACT

The present disclosure relates to a method, a device, and a computer program product for generating video. The method includes extracting a first text of a first language in an input video and generating a second text of a second language corresponding to the first text of the first language. The method further includes generating a gist frame of the input video based on the input video and the second text, where the gist frame indicates information associated with color configuration and object layout of the input video. In addition, the method further includes generating, based on the gist frame and the second text, an output video broadcasting the second text by means of the second language. The method of the present disclosure enhances the similarity of the output video and the input video, and expressions and actions of a narrator can be generated at a correct time point.

20 Claims, 8 Drawing Sheets

(51) Int. Cl.
*G06V 20/40* (2022.01)
*G10L 25/30* (2013.01)

(56) References Cited

U.S. PATENT DOCUMENTS

| | | | | |
|---|---|---|---|---|
| 2019/0057258 A1* | 2/2019 | Simske | .............. | H04N 21/8549 |
| 2021/0117691 A1* | 4/2021 | Shen | ........................ | G06F 18/22 |
| 2022/0004308 A1* | 1/2022 | Simpson | ............... | G06T 19/006 |
| 2024/0087557 A1* | 3/2024 | Levine | .................. | G10L 13/086 |

OTHER PUBLICATIONS

E. Mansimov et al., "Generating Images from Captions with Attention," International Conference on Learning Representations, arXiv:1511.02793v2, Feb. 29, 2016, 12 pages.

Z. Liu et al., "Video Frame Synthesis using Deep Voxel Flow," IEEE International Conference on Computer Vision (ICCV), Feb. 2017, pp. 4463-4471.

R. Villegas et al., "Decomposing Motion and Content for Natural Video Sequence Prediction," arXiv:1706.08033v2, Jan. 8, 2018, 22 pages.

V. Vukotic et al., "One-Step Time-Dependent Future Video Frame Prediction with a Convolutional Encoder-Decoder Neural Network," arXiv:1702.04125v2, Jul. 24, 2017, 11 pages.

T. Xue et al., "Visual Dynamics: Probabilistic Future Frame Synthesis via Cross Convolutional Networks," Advances in Neural Information Processing Systems, Dec. 2016, 9 pages.

S. Tulyakov et al., "MoCoGAN: Decomposing Motion and Content for Video Generation," IEEE/CVF Conference on Computer Vision and Pattern Recognition, Jun. 2018, pp. 1526-1535.

M. Mirza et al., "Conditional Generative Adversarial Nets," arXiv:1411.1784v1, Nov. 6, 2014, 7 pages.

R. Kiros et al., "Skip-thought Vectors," Proceedings of the 28th International Conference on Neural Information Processing Systems, vol. 2, Dec. 2015, 9 pages.

M. Arjovsky et al., "Wasserstein GAN," arXiv:1701.07875v3, Dec. 6, 2017, 32 pages.

C. Vondrick et al., "Generating Videos with Scene Dynamics," Proceedings of the 30th International Conference on Neural Information Processing Systems, Dec. 2016, 9 pages.

T. Salimans et al., "Improved Techniques for Training GANs," Conference on Neural Information Processing Systems, Dec. 2016, 9 pages.

Y. Li et al., "Video Generation from Text," The Thirty-Second AAAI Conference on Artificial Intelligence, Feb. 2018, 8 pages.

Y.-W. Chao et al., "Forecasting Human Dynamics from Static Images," arXiv:1704.03432v1, Apr. 11, 2017, 14 pages.

B. Chen et al., "Video Imagination from a Single Image with Transformation Generation," arXiv:1706.04124v2, Jun. 15, 2017, 9 pages.

J. Walker et al., "An Uncertain Future: Forecasting from Static Images using Variational Autoencoders," arXiv:1606.07873v1, Jun. 25, 2016, 17 pages.

* cited by examiner

FIG. 8

METHOD, DEVICE, AND COMPUTER PROGRAM PRODUCT FOR GENERATING VIDEO

RELATED APPLICATION

The present application claims priority to Chinese Patent Application No. 202310199233.8, filed Feb. 28, 2023, and entitled "Method, Device, and Computer Program Product for Generating Video," which is incorporated by reference herein in its entirety.

FIELD

The present disclosure relates to the field of image processing, and more specifically, relates to a method, a device, and a computer program product for generating video.

BACKGROUND

In some life or learning scenes, a video owner has a video, and characters in this video use a particular language to narrate a passage. In the process of narration, a narrator will make some expressions and actions to make the narration more vivid, so as to attract the attention of the audience. However, when some viewers whose mother tongue is another language want to understand the video, a usual approach is to extract the text content of the video, translate it into a language that the audience can understand, and then synthesize it into the original video in a form of subtitles.

In order to further improve the audience's experience, another approach is to use the translated text as a raw material to generate audio that the audience can understand, and then combine the generated audio and video together. However, the synthesized video often has a problem that the audio and video are not synchronized, which reduces the viewing experience of the audience.

SUMMARY

Embodiments of the present disclosure provide a method, a device, and a computer program product for generating video. For example, in an illustrative embodiment, an original video and translated text are used to generate a gist frame for setting a keynote of the video, and then the translated text is used again and is combined with the gist frame to generate an output video of audio and video synchronization.

According to an embodiment of the present disclosure, a method for generating video is provided. The method includes extracting a first text of a first language in an input video and generating a second text of a second language corresponding to the first text of the first language. The method further includes generating a gist frame of the input video based on the input video and the second text, where the gist frame indicates information associated with color configuration and object layout of the input video. In addition, the method further includes generating, based on the gist frame and the second text, an output video broadcasting the second text by means of the second language.

In a second aspect of the present disclosure, an electronic device is provided. The electronic device includes at least one processor, and a memory coupled to the at least one processor and having instructions stored thereon, wherein the instructions, when executed by the at least one processor, cause the electronic device to perform actions, the actions comprising: extracting a first text of a first language in an input video and generating a second text of a second language corresponding to the first text of the first language; generating a gist frame of the input video based on the input video and the second text, where the gist frame indicates information associated with color configuration and object layout of the input video; and generating, based on the gist frame and the second text, an output video broadcasting the second text by means of the second language.

In a third aspect of the present disclosure, a computer program product is provided. The computer program product is tangibly stored on a non-transitory computer-readable medium and comprises machine-executable instructions, wherein the machine-executable instructions, when executed by a machine, cause the machine to perform actions comprising: extracting a first text of a first language in an input video and generating a second text of a second language corresponding to the first text of the first language; generating a gist frame of the input video based on the input video and the second text, where the gist frame indicates information associated with color configuration and object layout of the input video; and generating, based on the gist frame and the second text, an output video broadcasting the second text by means of the second language.

It should be understood that this Summary is neither intended to limit key or essential features of embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of embodiments of the present disclosure will become more apparent with reference to the accompanying drawings and the following description. In the accompanying drawings, identical or similar reference numerals represent identical or similar elements, in which.

DETAILED DESCRIPTION

Illustrative embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As mentioned above, a video owner often wants to convert a video of a narrator narrating a passage in the original language into a video of the narrator narrating the passage in another language, and without losing information in the original video as much as possible at the same time. Moreover, it is desirable to synchronize scenes such as the narrator's expressions and actions with the audio in a target language. For example, a video owner has a video in which a narrator narrates a passage in English. The video owner hopes to convert the video into the narrator narrating the passage in Chinese. In some traditional methods, an English audio is extracted from the English video, the English audio is converted into an English text, and then the English text is translated into a Chinese text. After the translated Chinese text is obtained, a Chinese audio can be generated based on the Chinese text using a speech synthesis technology. By removing the English audio from the original video, and then adding the Chinese audio to the original video, a video of the narrator narrating the passage in Chinese can be generated.

However, due to differences in language and culture, there is often a great difference in time length between the audio after translation and the audio before translation. For example, a long sentence in English can be translated into a four-character idiom in Chinese, or even a two-character or three-character network buzzword, which will cause the generated Chinese audio to be shorter than the English audio. For example, the English audio in the original video may be 60 seconds, while the corresponding Chinese audio is only 30 seconds, which will lead to that 30 seconds of video have no sound after the narrator narrates the passage in the generated Chinese video for 30 seconds. At this time, the video in the second 30 seconds may need to be cut off, resulting in loss of information in the cut video.

On the other hand, the audio before translation and the audio after translation may have different word orders when expressing the same sentence, resulting in the narrator's unsynchronized expression and action, which brings poor experience to the audience. For example, in the original video, when narrating the sentence "I will be very happy if I can eat an apple" in English, the narrator may make a happy expression when saying "very happy," and make an apple gesture when saying "apple." However, when translating this sentence into Chinese, the expressions of the narrator may not properly align with the translated text. This phenomenon will have a negative impact on the audience watching video. Therefore, there is a need for a better method to convert videos in one language into videos in another language.

According to various embodiments of the present disclosure, a solution for generating video is provided. In embodiments of the present disclosure, an original text in an original language of an input video is extracted, and the original text is translated into a translated text in a target language. Then, a gist frame of the input video can be generated by using the input video and the translated text, where the gist frame indicates information associated with color configuration and object layout of the input video. The solution further includes generating, by using the gist frame and the translated text, an output video broadcasting the translated text using a target language.

According to the solution of embodiments of the present disclosure, an output video narrating in a target language is regenerated based on the input video narrating in the original language. Since the gist frame is used to generate a new video, the generated video has color matching and object layout of the input video, which enhances the similarity between the output video and the input video. In addition, because the translated text in the target language is also used to constrain the generation of the video when generating the video, the expressions and actions of the narrator can be generated at a correct time point according to the content of the translated text, so that the expressions and actions in the output video can be synchronized with the audio, and the loss of information in the input video can be reduced.

Illustrative embodiments of the present disclosure will be specifically described below with reference to the accompanying drawings.

Figure 1:
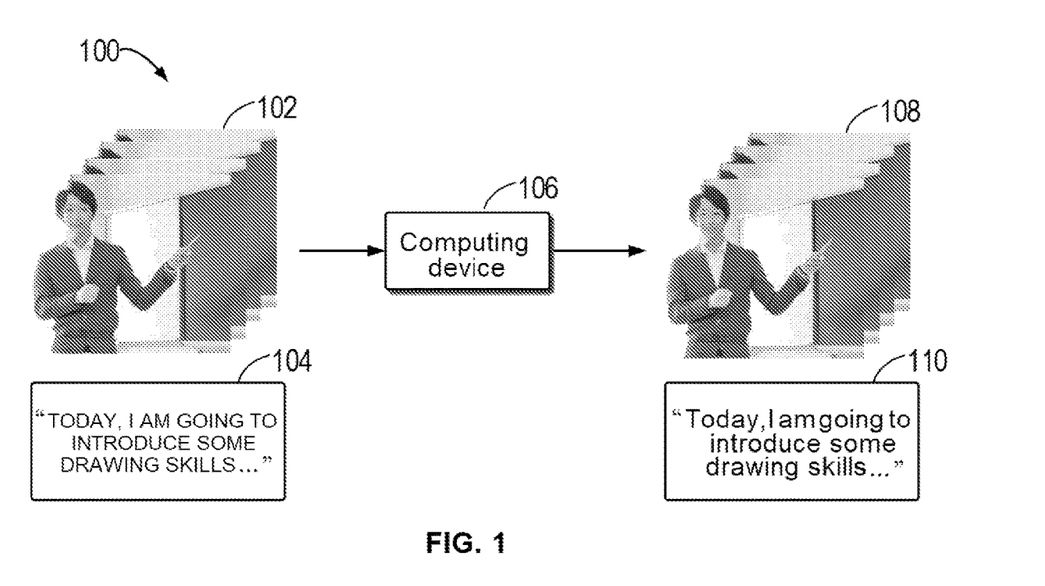
FIG. 1 illustrates a schematic diagram of an example environment in which a plurality of embodiments of the present disclosure can be implemented.

FIG. 1 is a schematic diagram of example environment 100 in which a plurality of embodiments of the present disclosure can be implemented. In environment 100, input video 102 and original text 104 are shown. A narrator in input video 102 narrates content of original text 104 by using an original language. The narrator can be a real person, a virtual person, a cartoon image, or other virtual objects. In an example shown in FIG. 1, the original language is English, and the content of original text 104 is an English text, for example, "Today, I am going to introduce some drawing skills . . . ". For simplicity, original text 104 in FIG. 1 shows only one sentence. However, input video 102 can be a video of any time length, so corresponding original text 104 can be a text of any length. Computing device 106 generates output video 108 after receiving input video 102. In output video 108, the narrator narrates the content in translated text 110 by using a target language. In the example shown in FIG. 1, it is assumed that the target language is Chinese, and translated text 110 is the Chinese translation corresponding to original text 104 in English. In output video 108, expressions and actions of the narrator correspond to the audio of the video. For example, at the 10th second of output video 108, when the narrator says "squint to observe the layout of the picture," the narrator makes a squint action. At the 20th second, when the narrator says that "the expression of the characters drawn should be exaggerated," the narrator makes an exaggerated expression.

Computing device 106 may be any device with a computing capability. Some examples of computing device 106 include, but are not limited to, a personal computer, a desktop computer, a portable computer, a server, a cloud-based server, a service node, an edge computing node, and the like.

In some embodiments, in order to generate an output video, the method described by the present disclosure is to extract an original text in an original language from an input video and generate a translated text in a target language based on the original text. To improve the similarity between the output video and the input video, the method includes generating a gist frame of the output video by using a gist generation model based on the input video and the translated text. The gist frame includes information of color configuration and object layout of the input video. In some embodiments, the method includes generating the output video by using a video generation model based on the gist frame and text features included in the translated text. In this way, expressions and actions in the generated output video can be synchronized with the audio. It should be understood that although English is used as an example of the original language and Chinese is used as an example of the translation language in embodiments of the present disclosure, the present disclosure is not intended to limit the original language to English and the translation language to Chinese. In the method provided in the present disclosure, the original language and the translation language can be any language. In some cases, the original language and the translated language can also be the same language.

Figure 2:
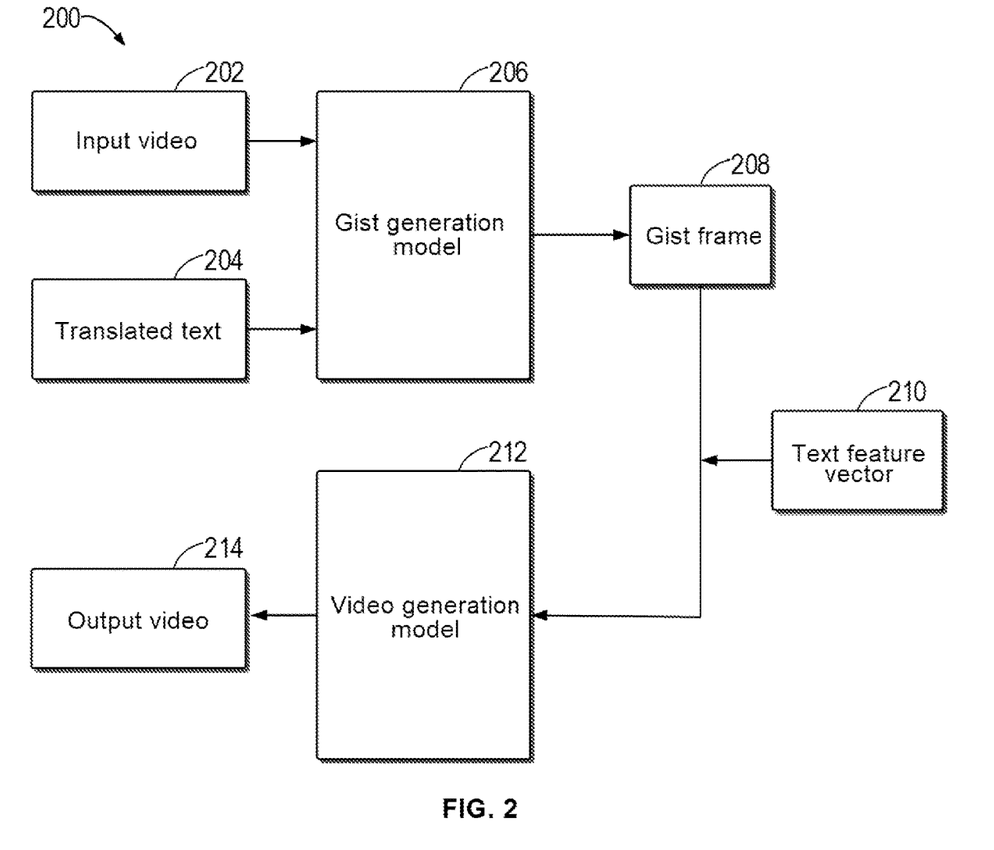
FIG. 2 shows a schematic diagram of a process for generating an output video according to some embodiments of the present disclosure.

FIG. 2 shows a schematic diagram of process 200 for generating an output video according to some embodiments of the present disclosure. As shown in FIG. 2, process 200 includes input video 202 (for example, input video 102 in FIG. 1). Input video 202 is a video narrated by a narrator in an original language. Process 200 includes extracting an audio part of the video from input video 202, and then extracting an original text in the original language from the audio part using technologies such as automatic speech recognition. Then, process 200 includes translating the original text in the original language into translated text 204 in a target language. In order to improve the similarity between the generated video and input video 202, process 200 includes using gist generation model 206 to generate gist frame 208 based on input video 202 and translated text 204. The image frame in input video 202 can provide information of color configuration and object layout of the gist frame for gist generation model 206, and translated text 204 can provide additional constraints on the gist frame for gist generation model 206. Generated gist frame 208 includes the information of color configuration and object layout of input video 202. To obtain information associated with expressions and actions of the narrator, process 200 includes extracting, from translated text 204, features in the text to obtain text feature vector 210. Then, process 200 may include generating output video 214 by using video generation model 212 based on gist frame 208 and text feature vector 210. Gist frame 208 can provide information of color configuration and object layout for video generation model 212, and text feature vector 210 can provide information associated with the expressions and actions for the video generation model, so as to enable the expressions and actions of the narrator in output video 214 to be synchronized with the audio.

As described above, in order to make the output video have the color configuration and object layout of the input video, the gist generation model can be used to generate the gist frame based on the input video and the translated text. In some embodiments, the gist generation model may include a text encoder, an image encoder, and an image decoder. In some embodiments, the gist frame can be generated based on a most representative image frame in the input video. In some embodiments, since the narrator will adjust the state before recording the video, it is often effective to extract the first frame of the input video as the representative frame. In some embodiments, the extracted representative frame can be verified to determine that it is a valid frame. For example, the image recognition technology can be used to identify whether a target object appears in the frame. If there is no target object in this frame, the narrator may not have entered the picture or is not ready. In some embodiments, if the current frame is not a valid frame, a second frame that is separated from the current frame by a predetermined threshold of the number of frames can be extracted to verify whether this frame is a valid frame, so on and so forth until a valid frame is found, and the valid frame is determined as the representative frame.

The translated text can provide additional constraints for the gist generation model to improve the quality of the generated gist frame. For example, if the translated text includes, "Today, I am going to introduce some drawing skills," it indicates that the gist frame should include painting-related content such as drawing board and canvas. In some embodiments, a summary description for the translated text can be provided to the gist generation model. The summary description is a sequence of words in natural language form. In some embodiments, since the narrator usually introduces the content overview of this video at the beginning of the video, the first sentence of the translated text can be extracted as the summary description of the translated text. In some embodiments, the extracted sentence can be verified to determine whether it conforms to the features of the summary description. For example, the number of words in a sentence can be determined. The number of words is illustratively greater than a predetermined threshold of the number of words to be used as the summary description. A list of high-frequency words can be obtained by calculating the number of occurrences of each word in the translated text. If the number of occurrences of a word in the translated text is greater than the predetermined threshold of the number of words, or if the word can be ranked first after the numbers of occurrences of all words are sorted, it means that the word is a high-frequency word in the translated text. By analyzing the whole translated text, a list of high-frequency words can be obtained. In some embodiments, the stop words (i.e., words that often appear in the language and have little practical meaning, such as "yes," "and," "then," etc.) are removed from the list of high-frequency words. If the number of high-frequency words included in the extracted sentence is greater than a predetermined threshold of the number of high-frequency words, this sentence can be used as the summary description.

In some embodiments, a gist frame can be generated by inputting a representative frame extracted from input video 202 and a summary description extracted from translated text 204 to gist generation model 206. In some embodiments, gist generation model 206 uses a text encoder to encode the summary description so as to obtain an encoded summary description for computing. In some embodiments, gist generation model 206 uses an image encoder to encode the representative frame to obtain an encoded representative frame for computing. In some embodiments, gist generation model 206 may generate a first implicit vector based on the encoded summary description and the encoded representative frame. The first implicit vector includes both text-based constraints provided in the summary description and image-based image features provided in the representative frame. In some embodiments, since the amount of information provided in the representative frame is far greater than that contained in the summary description, in order to strengthen the constraint of the summary description on the generated gist frame, gist generation model 206 can connect the encoded summary description with the first implicit vector again to obtain a second implicit vector, so as to strengthen the constraint of the summary description on the generation of the gist frame. In some embodiments, gist generation model 206 uses the image decoder to decode an implicit vector so as to obtain the gist frame.

Figure 3:
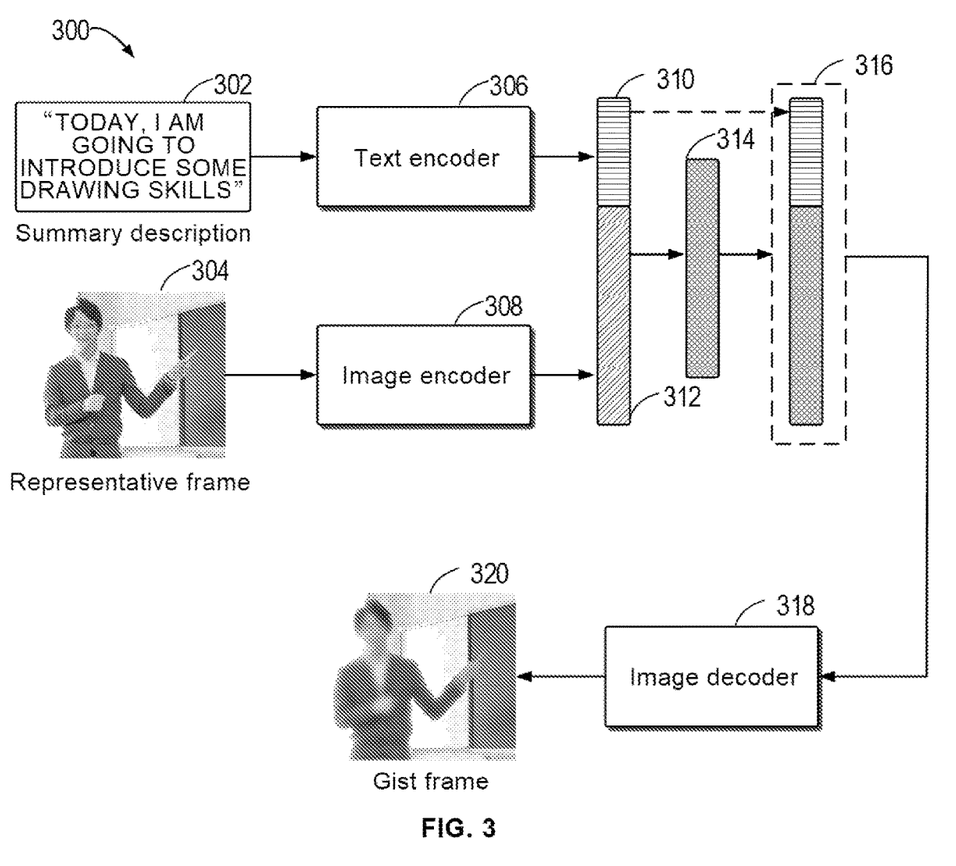
FIG. 3 shows a schematic diagram of a gist generation model according to some embodiments of the present disclosure.

FIG. 3 shows a schematic diagram of gist generation model 300 according to some embodiments of the present disclosure. In an example shown in FIG. 3, gist generation model 300 (such as gist generation model 206) receives input video 102 in FIG. 1 and extracts a first frame of input video 102. Gist generation model 300 uses a face recognition technology to detect whether there is a complete face in the first frame. In response to the detection of a complete face, gist generation model 300 uses the first frame as representative frame 304. Gist generation model 300 also receives translated text 110 in FIG. 1 and extracts the first sentence of translated text 110. In response to the determination that the number of words of the first sentence is greater than a predetermined threshold of the number of words, and that the number of occurrences of each of the two words "painting" and "skill" in translated text 110 is greater than a predetermined threshold of the number of occurrences, gist generation model 300 uses the first sentence as summary description 302.

After summary description 302 and representative frame 304 are obtained, gist generation model 300 encodes summary description 302 and representative frame 304 respectively by using text encoder 306 and image encoder 308. Gist generation model 300 encodes summary description 302 by using text encoder 306 to obtain encoded summary description 310. Encoded summary description 310 is a vector including text information of summary description 302. Gist generation model 300 uses image encoder 308 to encode representative frame 304 so as to obtain encoded representative frame 312. Encoded representative frame 312 is a vector including image information in representative frame 304.

Gist generation model 300 connects encoded summary description 310 and encoded representative frame 312 to obtain implicit vector 314 by means of linear conversion. Because the amount of information contained in summary description 302 is usually less than the amount of information contained in representative frame 304, in order to strengthen the influence of summary description 302 on the gist frame to be generated, gist generation model 300 connects encoded summary description 310 with implicit vector 314 again to obtain implicit vector 316. Then, gist generation model 300 decodes implicit vector 316 by using image decoder 318 to obtain gist frame 320. Gist frame 320 has color configuration and object layout of encoded representative frame 312, and meets constraints included in summary description 302. In the example shown in FIG. 3, by introducing encoded summary description 310 multiple times, the constraint of summary description 302 on the gist frame to be generated can be strengthened, so that generated gist frame 320 is more consistent with the content of the summary description.

When training the gist generation model, pairs of the summary description and the representative frame are used as training data. Loss function $\mathcal{L}_{gist}$ of the gist generation model is shown as the following Equation (1):

$$\mathcal{L}_{gist}(\theta_g, \phi_g; v, t) = \mathbb{E}_{q_{\phi_g}(z_g|v,t)}\left[\log p_{\theta_g}(v \mid z_g, t)\right] - KL\big(q_{\phi_g}(z_g \mid v, t) \| p(z_g)\big) \quad (1)$$

where $\theta_g$ and $\phi_g$ represent parameters related to a decoder network and an encoder network, subscript g represents the gist frame, v represents the representative frame, t represents the summary description text, and $z_g$ represents the implicit vector. $p(z_g)$ is a priori distribution of $z_g$, which, for example, can be set as an isotropic multivariate Gaussian distribution. The encoder network $q_{\phi_g}(z_g|v, t)$ has two sub encoder networks $\eta(\cdot)$ and $\psi(\cdot)$, where $\eta(\cdot)$ is applied to representative frame v, and $\psi(\cdot)$ is applied to summary description t. Linear conversion is applied to the gist generation model so as to connect the encoded representative frame and the summary description. Therefore, there is $z_g \sim \mathcal{N}(\mu_{\phi_g}[\eta(v); \psi(t)], \text{diag}(\sigma_{\phi_g}[\eta(v); \psi(t)]))$ where $KL(q_{\phi_g}(z_g|v,t) \| p(z_g))$ represents divergence between $p(z_g)$ and $q_{\phi_g}(z_g|v,t)$.

In order to generate a video with expressions and actions synchronized with the audio, in addition to the gist frame, information contained in the translated text also should be considered, and the video generation model is used to generate the output video based on the gist frame and the translated text. However, if the gist frame and the translated text are simply encoded, and then the encoded gist frame and the encoded translated text are connected together for use, it will lead to over-reliance on the gist frame and the translated text, thereby making it very difficult to adjust the length and relative strength of the feature. Therefore, in embodiments of the present disclosure, the video generation model can use the encoder to encode the translated text to obtain the encoded translated text, and then apply the convolutional network to the encoded translated text so as to obtain a text feature vector of the translated text. In this way, the text information in the translated text can be utilized in a more robust and efficient manner.

Figure 4:
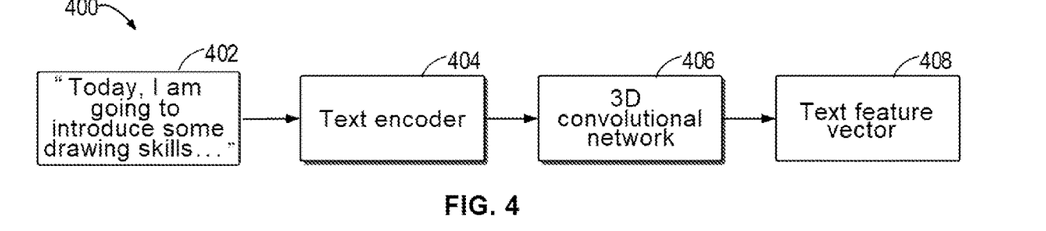
FIG. 4 shows a schematic diagram of a process for generating a text feature vector based on a translated text according to some embodiments of the present disclosure.

FIG. 4 shows a schematic diagram of process 400 for generating a text feature vector based on a translated text according to some embodiments of the present disclosure. In an example shown in FIG. 4, translated text 402 is assumed to be a Chinese text. For simplicity, only the first sentence of this Chinese text is shown in FIG. 4, and the following content is omitted. However, it should be noted that, unlike the summary description described above, the translated text is a text that includes all the contents narrated by the narrator, while the summary description is a summary of the translated text. Generally, the translated text is different from the summary description. In some cases, the translated text includes the summary description. As shown in FIG. 4, process 400 includes encoding by using text encoder 404 to obtain encoded translated text. Then, the encoded translated text output by text encoder 404 is input into 3D convolution network 406 to obtain text feature vector 408. Text feature vector 408 includes text features in translated text 402. The size of 3D convolution network 406 may be Fc×Ft×kx×ky×kz, where Ft is a length of a vector of the encoded translated text, Fc is the number of output channels, and kx×ky×kz is the size of the kernel.

After obtaining text feature vector 408, the video generation model can generate a video with expressions and actions synchronized with the audio by using text feature vector 408 and gist frame 320 obtained in the above text. In some embodiments, an embedded vector can be obtained based on gist frame 320 and text feature vector 408 of translated text 402, and the embedded vector includes information of gist frame 320 and text feature vector 408. In some embodiments, in order to strengthen the influence of gist frame 320 and translated text 402 on the expressions and actions in the generated video, the embedded vector can be encoded by the encoder to obtain a first implicit vector. In order to make the generated expressions and actions more diverse, in some embodiments, a second implicit vector can be obtained based on the first implicit vector and random noise, and then a video is generated by using the video generator based on the second implicit vector.

In the training phase, the video generation model uses a discriminator to determine whether the generated video is similar to a real reference video. The goal of the video generator is to generate a realistic video, while the goal of the discriminator is to determine whether the video is real or generated. The video generator and the discriminator will be jointly trained.

Figure 5:
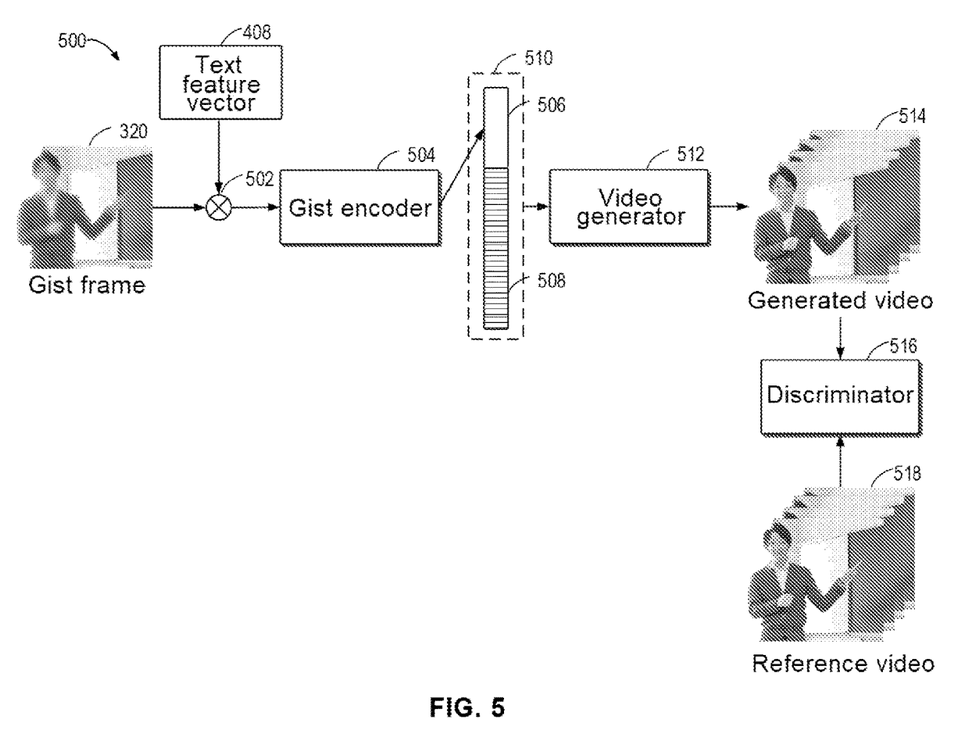
FIG. 5 shows a schematic diagram of a video generation model according to some embodiments of the present disclosure.

FIG. 5 shows a schematic diagram of video generation model 500 according to some embodiments of the present disclosure. As shown in FIG. 5, gist frame 320 is a gist frame generated in FIG. 3, and text feature vector 408 is a text feature vector of a translated text generated in FIG. 4. Dot product operation 502 is performed on gist frame 320 and text feature vector 408 to obtain an embedded vector. Encoded embedded vector 506 is obtained from the embedded vector by means of gist encoder 504. Video generation model 500 connects encoded embedded vector 506 and random noise vector 508 to obtain implicit vector 510. Random noise vector 508 can use noise such as equidistant Gaussian noise. Random noise vector 508 can make the generated expressions and actions more diverse. Then, video generation model 500 can input implicit vector 510 into video generator 512 to obtain generated video 514. The generated video can be represented by the following Equation (2):

$$G(z_v) = \alpha(z_v) \odot m(z_v) + (1 - \alpha(z_v)) \odot s(z_v) \quad (2)$$

where $z_v$ represents implicit vector 510; the output of is 4D tensor, and all elements are constrained between 0 and 1; $\odot$ is an element-wise multiplication; $\alpha(\cdot)$ and $m(\cdot)$ are neural networks using 3D full convolutional layers; $\alpha(\cdot)$ is a mask matrix for separating a static scene from the expressions and actions. For example, the static scene can be a drawing board behind the narrator, the ceiling of a room, a table, or even the narrator's body. The output of $s(\cdot)$ is a static background picture, which is repeated in all frames of the generated video. The value of $s(\cdot)$ is from an independent neural network with a 2D convolutional layer.

So far, by connecting encoded embedded vector 506 with random noise vector 508, implicit vector 510 can have the information of the gist frame and the translated text, but also have randomness, so that more details and dynamic parts of the video (such as expressions and actions) can be generated in the static scene based on the gist frame, the quality of the generated video can also be improved, and the training efficiency of the model can be improved.

In the reasoning stage, video generation model 500 uses generated video 514 as an output video for output. In the training stage, discriminator 516 determines whether generated video 514 is a generated video or a real video based on its cognition of reference video 518. The training goal of video generator 512 is to generate a video that can deceive discriminator 516 and make it mistake the generated video as a real video instead of a generated video. The training goal of discriminator 516 is to improve its judgment ability so that it is not deceived by video generator 512.

Figure 6:
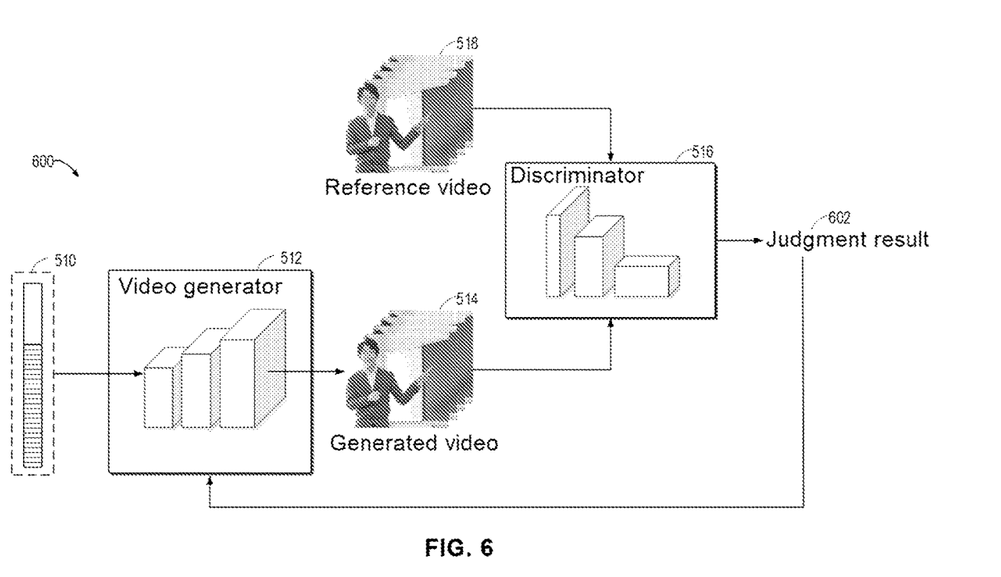
FIG. 6 shows a schematic diagram of a process for training a video generator and a discriminator according to some embodiments of the present disclosure.

FIG. 6 shows a schematic diagram of process 600 for training a video generator and a discriminator according to some embodiments of the present disclosure. In an example shown in FIG. 6, video generator 512 consists of two 3D full convolutional layers and an independent neural network with a 2D convolutional layer. Discriminator 516 consists of multiple convolutional layers and full connectivity layers. Process 600 includes inputting implicit vector 510 to video generator 512. After video generator 512 outputs generated video 514, discriminator 516 determines whether generated video 514 is generated by video generator 512. The goal of discriminator 516 is to accurately distinguish a generated video from a real video, while the goal of video generator 512 is to generate a realistic video to make discriminator 516 make wrong judgments. Discriminator 516 obtains a prior distribution of the real video from reference video 518. When a video is input to discriminator 516, the discriminator determines whether the input video conforms to the prior distribution of the real video or the distribution of the generated video, thus obtaining judgment result 602. Judgment result 602 can be back-propagated to video generator 512 to help train video generator 512. A loss function $\mathcal{L}_{video}$ of the video generation model is represented by the following Equation (3):

$$\mathcal{L}_{video} = \min_{\theta_G \in \Theta_G} \max_{\theta_D} \mathbb{E}_{V \sim p(V)}[D(V; \theta_D)] - \mathbb{E}_{z_v \sim p(z_v)}[D(G(z_v; \theta_G); \theta_D)] \quad (3)$$

where V represents reference video 518, $z_v$ represents implicit vector 510, G represents video generator 512, D represents discriminator 516, $\theta_G$ represents a parameter of video generator 512, and $\theta_D$ represents a parameter of discriminator 516. Function D distinguishes between a real video-text pair and a generated video-text pair, and parameter $\theta_D$ is limited to maintain the maximum Lipschits constant of function D. By means of joint training of video generator 512 and discriminator 516, the generated video can look like a real video.

In addition to ensuring that the generated video looks like the input real video, it is also desirable to ensure that the generated video contains all information in the real video as much as possible. The similarity between videos can be defined based on the percentage of similar frames between the generated video and the real video. In some embodiments, it can be determined the number of frames whose similarity with any frame in the generated video is greater than a predetermined threshold in the real video. It is also possible to determine the number of frames whose similarity with any frame in the real video is greater than a predetermined threshold in the generated video. Then, the video similarity of the generated video and the real video can be determined based on the total number of frames of the real video, the total number of frames of the generated video, the number of frames in the real video whose similarity with any frame of the generated video is greater than the predetermined threshold, and the number of frames in the generated video whose similarity with any frame of the real video is greater than the predetermined threshold. For example, the generated video includes 200 frames, while the real video includes 300 frames. Of the 300 frames of the real video, 250 frames can be found to have a similarity greater than 95% with frames in the 200 frames of the generated video. Of the 200 frames of generated video, 150 frames can be found to have a similarity of more than 95% with frames in the 300 frames of the real video. A total of 400 frames in the two videos can be found to have a similarity of more than 95% with frames in the frame sequence of the other video. At the same time, there are a total of 500 frames in the two videos. 400 frames can be divided by 500 frames to obtain a similarity of 80% between the two videos. The similarity can be expressed by the following Equation (4):

$$nvs(X, Y; \epsilon) \triangleq \frac{\sum_{x \in X} 1_{\{y \in Y: d(x,y) \leq \epsilon\}} + \sum_{y \in Y} 1_{\{x \in X: d(y,x) \leq \epsilon\}}}{|X| + |Y|} \quad (4)$$

where nvs(X, Y; ϵ) represents the similarity between videos X and Y, ϵ represents an error, d(x, y) represents the similarity between the xth frame in video X and the yth frame in video Y, $1_{\{y \in Y: d(x,y) \leq \epsilon\}}$ represents that it is recorded as 1 if there is a frame in video Y having a similarity less than error e with the xth frame in video X, $1_{\{x \in X;\ d(y,x) \leq \epsilon\}}$ represents that it is recorded as 1 if there is a frame in video X having a similarity less than error e with the yth frame in video Y, |X| represents a total number of frames of video X, and |Y| represents a total number of frames of video Y.

In the training phase, joint training is performed on the gist generation model and the video generation model. The overall target function is represented by a combination of the loss function $\mathcal{L}_{gist}$ of the gist generation model and the loss function $\mathcal{L}_{video}$ of the video generation model. Additionally, to improve the efficiency of joint training, a difference between the generated video vector and the real video vector can also be determined. Then, based on the loss function of the gist generation model, the loss function of the video generation model, the difference between the generated video vector and the real video vector, and the similarity between the generated video and the real video, the gist generation model and the video generation model are jointly trained. In some embodiments, the difference between the generated video vector and the real video vector can be represented by $\mathcal{L}_{RECONS} = \|G - \hat{V}\|$, where G represents the generated video, and V represents the input real video. The final target function can be represented by the following Equation (5):

$$\mathcal{L} = \gamma_1 \mathcal{L}_{gist} + \gamma_2 \mathcal{L}_{video} + \gamma_3 \mathcal{L}_{RECONS} - \gamma_4 nvs(X, Y; \epsilon). \quad (5)$$

where $\gamma_1$, $\gamma_2$, $\gamma_3$, and $\gamma_4$ are scalar weights for each loss item, for example, $\gamma_1 = \gamma_2 = 1$ and $\gamma_3 = \gamma_4 = 0.1$. By means of performing joint training on the gist generation model and the video generation model based on the loss function of the gist generation model, the loss function of the video generation model, the difference between the generated video vector and the real video vector, and the similarity between the generated video and the real video, it can not only ensure the similarity between the generated video and the real video, but also ensure that the generated video does not lose the information in the input video as much as possible.

Figure 7:
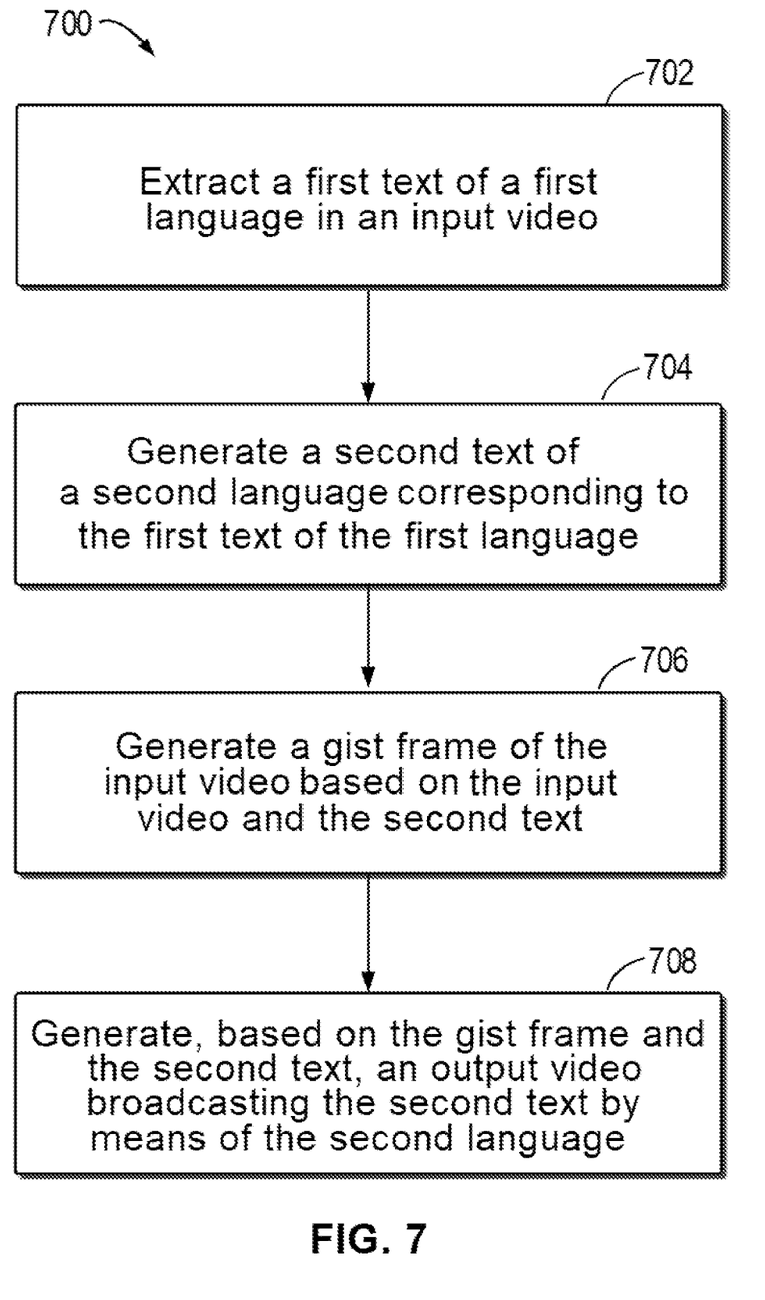
FIG. 7 shows a flowchart of a method for generating video according to some embodiments of the present disclosure.

FIG. 7 shows a flowchart of method 700 for generating video according to some embodiments of the present disclosure. At block 702, method 700 includes extracting a first text of a first language in an input video. For example, as shown in FIG. 1, method 700 includes extracting English original text 104 from input video 102 narrated by a narrator in English. To extract original text 104, an original audio of input video 102 can be obtained from input video 102, and original text 104 can be extracted from the original audio by means of a speech recognition technology.

At block 704, method 700 includes generating a second text of a second language corresponding to the first text of the first language. For example, as shown in FIG. 1, translated text 110 in Chinese can be translated based on original text 104 in English. For example, original text 104 can be "Today, I am going to introduce some drawing skills . . . ," and translated text 110 can be that text translated to Chinese.

At block 706, method 700 includes generating a gist frame of the input video based on the input video and the second text. The gist frame indicates information associated with color configuration and object layout of the input video. For example, as shown in FIG. 3, method 700 includes generating gist frame 320 based on representative frame 304 in the input video and summary description 302 of the translated text, and gist frame 320 includes information associated with color configuration and object layout of representative frame 304.

At block 708, method 700 includes generating, based on the gist frame and the second text, an output video broadcasting the second text by means of the second language. For example, as shown in FIG. 5, method 700 includes outputting generated video 514 by means of gist frame 320 and text feature vector 408 of the translated text.

Method 700 stated above may include generating a new video by means of a gist frame. Therefore, the generated video has the color and object layout of an input video, which enhances the similarity between the generated video and the input video. In addition, since the translated text is also used to constrain the video generation when generating the video, expressions and actions of a narrator can be generated at a correct time point according to the content of the translated text, so that the expressions and actions in the output video can be synchronized with the audio, and loss of the information contained in the input video can be reduced.

Figure 8:
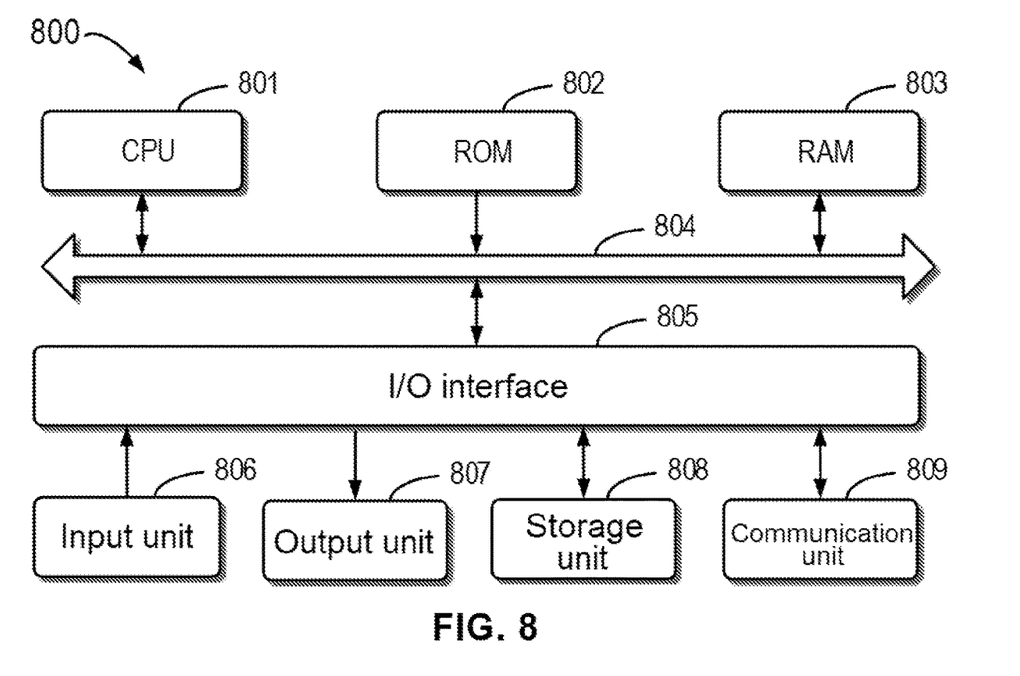
FIG. 8 shows a block diagram of a device that can implement multiple embodiments of the present disclosure.

FIG. 8 is a block diagram of example device 800 that can be used to implement an embodiment of the present disclosure. As shown in the figure, device 800 includes computing unit 801, which may execute various appropriate actions and processing according to computer program instructions stored in read-only memory (ROM) 802 or computer program instructions loaded from storage unit 608 onto random access memory (RAM) 803. Various programs and data required for the operation of device 800 may also be stored in RAM 803. Computing unit 801, ROM 802, and RAM 803 are connected to each other through bus 804. Input/Output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices via a computer network, such as the Internet, and/or various telecommunication networks.

Computing unit 801 may be various general-purpose and/or special-purpose processing components with processing and computing capabilities. Some examples of computing units 801 include, but are not limited to, central processing units (CPUs), graphics processing units (GPUs), various specialized artificial intelligence (AI) computing chips, various computing units for running machine learning model algorithms, digital signal processors (DSPs), and any appropriate processors, controllers, microcontrollers, etc. Computing unit 801 performs various methods and processes described above, such as method 700. For example, in some embodiments, method 700 may be implemented as a computer software program that is tangibly included in a machine-readable medium, such as storage unit 808. In some embodiments, part or all of the computer program may be loaded and/or installed onto device 800 via ROM 802 and/or communication unit 809. When the computer program is loaded to RAM 803 and executed by computing unit 801, one or more steps of method 700 described above may be performed. Alternatively, in other embodiments, computing unit 801 may be configured to implement method 700 in any other suitable manners (such as by means of firmware).

The functions described herein may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flowcharts and/or block diagrams. The program code can be completely executed on a machine, partially executed on a machine, partially executed on a machine and partially executed on a remote machine as an independent software package, or completely executed on a remote machine or a server.

In the context of the present disclosure, a machine-readable medium may be a tangible medium that may include or store a program for use by an instruction execution system, apparatus, or device or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method for generating video, comprising:
   extracting a first text of a first language in an input video;
   generating a second text of a second language corresponding to the first text of the first language;
   generating a gist frame of the input video based on the input video and the second text, wherein the gist frame indicates information associated with color configuration and object layout of the input video; and
   generating, based on the gist frame and the second text, an output video broadcasting the second text by means of the second language.

2. The method according to claim 1, wherein generating the gist frame of the input video based on the input video and the second text comprises:
   extracting a summary description for the second text;
   extracting a representative frame of the input video;
   encoding the summary description by a text encoder to obtain an encoded summary description; and
   encoding the representative frame by an image encoder to obtain an encoded representative frame.

3. The method according to claim 2, wherein generating the gist frame of the input video based on the input video and the second text further comprises:
   performing linear conversion on the encoded summary description and the encoded representative frame to obtain a first implicit vector;
   connecting the encoded summary description and the first implicit vector to obtain a second implicit vector; and
   decoding the second implicit vector by using an image decoder to obtain the gist frame of the input video.

4. The method according to claim 3, further comprising:
   generating a first loss function used for a gist generation model based on the input video, at least one of the first text and the second text, and the first implicit vector; and
   training the gist generation model by using the first loss function, wherein the gist generation model is composed of the text encoder, the image encoder, and the image decoder.

5. The method according to claim 4, wherein training the gist generation model by using the first loss function comprises:
   generating a first video by using a video generator;
   determining, by means of a discriminator, whether the first video is a video generated by the video generator;
   generating a second loss function used for a video generation model based on a parameter of the video generator, a parameter of the discriminator, the first video, and a reference video used for training; and
   training the video generation model by means of the first loss function and the second loss function, wherein the video generation model is composed of the text encoder, a gist encoder, the video generator, and the discriminator.

6. The method according to claim 5, wherein training the video generation model by means of the first loss function and the second loss function comprises:

determining, in the input video, a first number of frames having a similarity with any frame in the output video greater than a predetermined threshold;

determining, in the output video, a second number of frames having a similarity with any frame in the input video greater than the predetermined threshold; and determining a video similarity between the input video and the output video based on a total number of frames of the input video, a total number of frames of the output video, the first number, and the second number.

7. The method according to claim 6, wherein training the video generation model by means of the first loss function and the second loss function further comprises:

determining an input video vector indicating the input video and an output video vector indicating the output video;

determining a difference between the input video vector and the output video vector; and performing joint training on the gist generation model and the video generation model based on the first loss function, the second loss function, the video similarity between the input video and the output video, and the difference between the input video vector and the output video vector.

8. The method according to claim 2, wherein extracting the summary description for the second text from the second text comprises:

extracting a first sentence of the second text;

determining that the number of words of the first sentence is greater than a predetermined threshold of the number of words;

determining a list of high-frequency words of the second text, wherein the number of occurrences of the words in the list of high-frequency words in the second text is greater than a predetermined threshold of the number of occurrences;

determining that except for stop words, the number of words appearing in the list of high-frequency words in the first sentence is greater than a predetermined threshold of the number of high-frequency words; and using the first sentence as the summary description.

9. The method according to claim 2, wherein extracting the representative frame of the input video from the input video comprises:

extracting a first frame of the input video;

determining that a target object appears in the first frame; and using the first frame as the representative frame.

10. The method according to claim 1, wherein generating, based on the gist frame and the second text, the output video broadcasting the second text by means of the second language comprises:

encoding the second text by using a text encoder to obtain an encoded second text; and applying a convolutional network to the encoded second text so as to obtain a text feature vector for the second text.

11. The method according to claim 10, wherein generating, based on the gist frame and the second text, the output video broadcasting the second text by means of the second language further comprises:

obtaining an embedded vector based on the gist frame and the text feature vector for the second text, wherein the embedded vector comprises information of the gist frame and the text feature vector;

encoding the embedded vector by using a gist encoder to obtain an encoded embedded vector; and generating the output video by using a video generator based on the encoded embedded vector and random noise.

12. An electronic device, comprising:

at least one processor; and a memory coupled to the at least one processor and having instructions stored thereon, wherein the instructions, when executed by the at least one processor, cause the electronic device to perform actions comprising:

extracting a first text of a first language in an input video;

generating a second text of a second language corresponding to the first text of the first language;

generating a gist frame of the input video based on the input video and the second text, wherein the gist frame indicates information associated with color configuration and object layout of the input video; and generating, based on the gist frame and the second text, an output video broadcasting the second text by means of the second language.

13. The electronic device according to claim 12, wherein generating the gist frame of the input video based on the input video and the second text comprises:

extracting a summary description for the second text from the second text;

extracting a representative frame of the input video from the input video;

encoding the summary description by a text encoder to obtain an encoded summary description; and encoding the representative frame by an image encoder to obtain an encoded representative frame.

14. The electronic device according to claim 13, wherein generating the gist frame of the input video based on the input video and the second text further comprises:

performing linear conversion on the encoded summary description and the encoded representative frame to obtain a first implicit vector;

connecting the encoded summary description and the first implicit vector to obtain a second implicit vector; and decoding the second implicit vector by using an image decoder to obtain the gist frame of the input video.

15. The electronic device according to claim 14, further comprising:

generating a first loss function used for a gist generation model based on the input video, at least one of the first text and the second text, and the first implicit vector; and training the gist generation model by using the first loss function, wherein the gist generation model is composed of the text encoder, the image encoder, and the image decoder.

16. The electronic device according to claim 13, wherein extracting the summary description for the second text from the second text comprises:

extracting a first sentence of the second text;

determining that the number of words of the first sentence is greater than a predetermined threshold of the number of words;

determining a list of high-frequency words of the second text, wherein the number of occurrences of the words in the list of high-frequency words in the second text is greater than a predetermined threshold of the number of occurrences;

determining that except for stop words, the number of words appearing in the list of high-frequency words in the first sentence is greater than a predetermined threshold of the number of high-frequency words; and using the first sentence as the summary description.

17. The electronic device according to claim 13, wherein extracting the representative frame of the input video from the input video comprises:
- extracting a first frame of the input video;
- determining that a target object appears in the first frame; and
- using the first frame as the representative frame.

18. The electronic device according to claim 12, wherein generating, based on the gist frame and the second text, the output video broadcasting the second text by means of the second language comprises:
- encoding the second text by using a text encoder to obtain an encoded second text; and
- applying a convolutional network to the encoded second text so as to obtain a text feature vector for the second text.

19. The electronic device according to claim 18, wherein generating, based on the gist frame and the second text, the output video broadcasting the second text by means of the second language further comprises:
- obtaining an embedded vector based on the gist frame and the text feature vector for the second text, wherein the embedded vector comprises information of the gist frame and the text feature vector;
- encoding the embedded vector by using a gist encoder to obtain an encoded embedded vector; and
- generating the output video by using a video generator based on the encoded embedded vector and random noise.

20. A computer program product that is tangibly stored on a non-transitory computer-readable medium and comprises machine-executable instructions, wherein the machine-executable instructions, when executed by a machine, cause the machine to perform actions comprising:
- extracting a first text of a first language in an input video;
- generating a second text of a second language corresponding to the first text of the first language;
- generating a gist frame of the input video based on the input video and the second text, wherein the gist frame indicates information associated with color configuration and object layout of the input video; and
- generating, based on the gist frame and the second text, an output video broadcasting the second text by means of the second language.

\* \* \* \* \*